June 19, 1934.  J. F. DUFFY  1,963,940

FLEXIBLE BEARING

Filed Nov. 14, 1932

Inventor
James Francis Duffy
By Livrance &
Van Antwerp
Attorneys

Patented June 19, 1934

1,963,940

UNITED STATES PATENT OFFICE 1,963,940

FLEXIBLE BEARING

James Francis Duffy, Holland, Mich., assignor to Duffy Manufacturing Company, Holland, Mich., a corporation of Michigan Application November 14, 1932, Serial No. 642,585

3 Claims. (Cl. 308—4)

This invention relates generally to a bearing and more particularly to a grommet for the usual accelerator rod extending from the foot feed device of an automobile in a manner well understood by those skilled in this art.

In locations of this character, the accelerator rod oftentimes, either accidentally or purposely, does not extend at exactly right angles to the floor board through which it extends and furthermore in many instances the rod does not have a true reciprocatory motion but shifts laterally as will be understood from the following disclosure.

However, it is to be understood that my novel bearing is capable of being used in many and varied structures and only two of these are shown in the present patent application.

Briefly described, my improved structure consists of a supporting base and a bearing member, these two members being so connected that a limited degree of movement may be had therebetween thus permitting the bearing member to aline itself with the member supported therein. Preferably a graphite or metal bearing is centrally encased in the flexible rubber support so that a proper bearing surface will be had for frictionlessly supporting the moving member located therewithin.

One of the principal advantages of my construction is that the flexible rubber mounting will permit the bearing sleeve to move so that the shaft or rod, which is rotatably or slidably mounted therein, may aline itself for easy and free movement. In other words, the axis of the bearing sleeve need not be at exactly right angles to the supporting base of the device.

Another advantage of my device lies in the fact that the rubber mounting permits the revolving shaft which is located therein to seek and obtain its "true axis of rotation" so as to eliminate or at least diminish the vibration of the shaft. Furthermore, the tendency of the rubber mounting is to damp out any vibrations which may be present in the rotating shaft.

Yet another advantage resides in the tight closure obtainable around the accelerator rod whereby entry of air therethrough is prevented.

Further objects and advantages will be apparent as the description proceeds.

In the drawing.

Similar numerals refer to similar parts throughout the several views.

Figure 1:
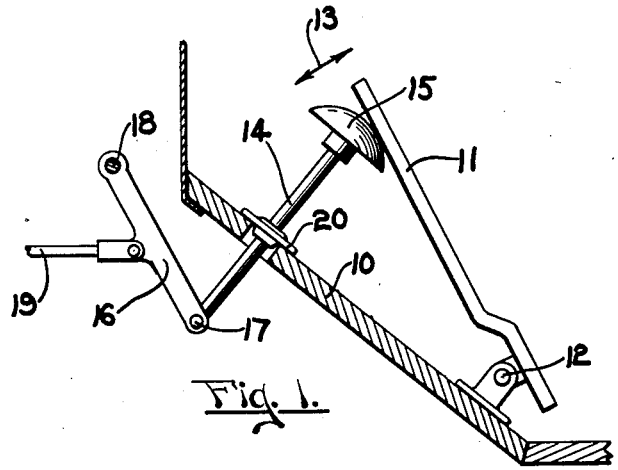
Fig. 1 is a view in cross section through the floorboard of an automobile disclosing my invention as applied to the accelerator rod of a carburetor.

Referring to Fig. 1, 10 indicates the usual foot board of an automobile having an accelerator pedal 11 hinged as indicated at 12, the movement of this accelerator pedal being indicated by the arrow 13. A rod 14 has a head 15 and passes through my novel flexible grommet or bearing 20 and connects with the lever 16 as indicated at 17. The lever 16 is pivotally mounted at 18 and a rod 19 extends to the carburetor whereby the throttle valve (not shown) thereof is controlled.

Movement of the foot pedal 11 downwardly under the pressure of the operator's foot will cause the rod 14 to slide through the grommet 20 and the rod will also move slightly laterally as well as reciprocate through the grommet 20. This lateral movement is caused by the oscillation of the pivot connection 17 and is taken care of by the movement permitted by the resilient construction of the device.

Figure 3:
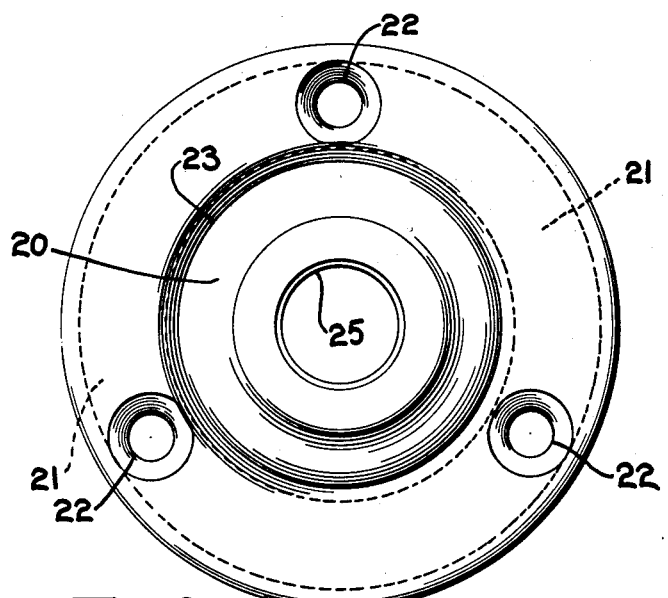
Fig. 3 is a front view of the novel article.
Figure 4:
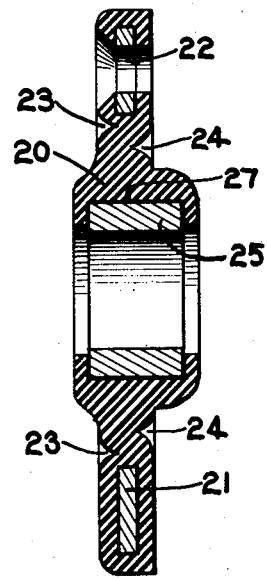
Fig. 4 is a view in cross section, through Fig. 3, showing the bearing sleeve.

Referring now to Figs. 3 and 4, it will be seen that a reinforcing ring 21 is provided, indicated in dotted lines in Fig. 3, and shown in cross section in Fig. 4, this metal ring being perforated to form the openings 22 whereby the same may be held in position. Rubber composition is molded around this metal ring and extends inwardly, grooves 23 and 24 being concentrically formed and located as clearly shown in the drawing.

Figure 5:
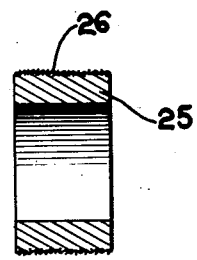
Fig. 5 is a cross sectional view through the bearing sleeve showing the fabric covering embedded therearound.

A bearing sleeve 25, formed of graphite or the like, has a fabric strip 26 fastened thereon at its outer periphery, see Fig. 5, and this fabric strip 26 provides a frictional connection with the rubber as indicated at 27 whereby the bearing sleeve is held against movement in its mounting. The rubber is molded about the bearing sleeve 25, see Fig. 4, and terminates slightly outwardly relative to the inner bearing surface of the bearing sleeve whereby it will not contact with the shaft or rod movably carried by the bearing sleeve.

Figure 6:
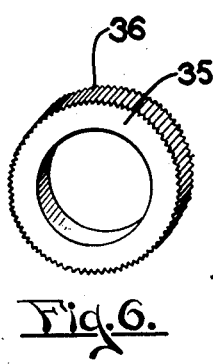
Fig. 6 is a perspective view of a modified form of bearing sleeve.

Fig. 6 shows a modified form of the bearing sleeve 35, said sleeve being ribbed or corrugated as indicated at 36.

Figure 2:
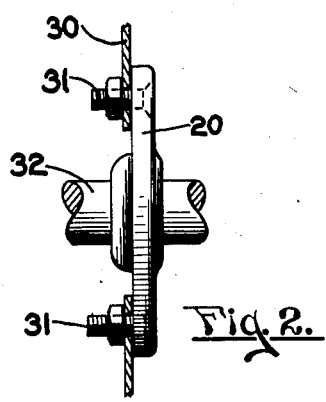
Fig. 2 shows an application of my invention as applied to a rotating shaft.

Fig. 2 shows another application of my grommet 20, such being held in place upon a member 30 by the bolts 31, and a shaft 32 is revolubly mounted therein.

From the above necessarily brief description, it will be appreciated that I have invented and created an article of manufacture which will admirably serve the several purposes for which it is intended. However, I desire it to be understood that the invention is in nowise limited to the particular illustrative embodiment herewith disclosed, but that the scope of my invention is as set forth in the following claims.

I claim:

1. In combination, a circular base, rubber means extending inwardly from said circular base, a sleeve member, said rubber means extending entirely along and around the ends of said sleeve member to support the same, said rubber supporting means being cut away immediately adjacent the said base portion whereby movement of the sleeve member will cause deflection of the rubber supporting means at the said weakened points.

2. In a flexible bearing construction of the class described, a circular base, rubber means fastened to and extending inwardly from the circular base and a sleeve member of rigid construction, the rubber means being securely attached to the sleeve member, said rubber means having a concentric groove on each face, one groove being located immediately adjacent the sleeve member and the other groove being located immediately adjacent the circular base.

3. In a flexible bearing construction of the class described, a base extending circumferentially, rubber means extending radially inward therefrom, an anti-friction sleeve and means for mounting the said sleeve onto the rubber means, said rubber means having spaced apart grooves at opposite sides whereby a relatively narrow portion of the rubber means is formed angularly located with respect to the plane of the base for the purpose described.

JAMES FRANCIS DUFFY.